(12) United States Patent
Ouyang et al.

(10) Patent No.: US 10,212,091 B2
(45) Date of Patent: *Feb. 19, 2019

(54) METHODS AND SYSTEMS FOR EVALUATING VOICE OVER WI-FI (VOWIFI) CALL QUALITY

(71) Applicant: Verizon Patent and Licensing Inc., Arlington, VA (US)

(72) Inventors: Ye Ouyang, Piscataway, NJ (US); Carol Becht, Boonton, NJ (US); Krishna Pichumani Iyer, Basking Ridge, NJ (US); Le Su, Somerville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,837

(22) Filed: May 9, 2018

(65) Prior Publication Data
US 2018/0262433 A1 Sep. 13, 2018

Related U.S. Application Data

(63) Continuation of application No. 15/199,265, filed on Jun. 30, 2016, now Pat. No. 9,992,123.

(51) Int. Cl.
| H04L 12/853 | (2013.01) |
| H04L 29/06 | (2006.01) |
| H04L 12/26 | (2006.01) |
| H04L 12/24 | (2006.01) |
| H04M 3/22 | (2006.01) |

(Continued)

(52) U.S. Cl.
CPC ...... *H04L 47/2416* (2013.01); *H04L 41/5035* (2013.01); *H04L 43/08* (2013.01); *H04L 65/608* (2013.01); *H04L 65/80* (2013.01); *H04M 3/2236* (2013.01); *H04L 43/087* (2013.01); *H04L 43/0829* (2013.01); *H04L 43/0847* (2013.01); *H04L 43/0888* (2013.01);
(Continued)

(58) Field of Classification Search
CPC . H04L 47/2416; H04M 3/2236; H04M 7/006; H04W 84/12; H04W 24/08
See application file for complete search history.

(56) References Cited

U.S. PATENT DOCUMENTS

| 9,119,086 | B1 * | 8/2015 | Ouyang | H04W 24/02 |
| 2016/0373944 | A1 * | 12/2016 | Jain | H04L 43/50 |
| 2017/0078171 | A1 * | 3/2017 | Tapia | H04L 43/08 |

* cited by examiner

*Primary Examiner* — Hashim S Bhatti (57) ABSTRACT

A method, a device, and a non-transitory storage medium provide receiving a plurality of voice call quality values and values for a plurality key performance indicators (KPIs) related to voice over Wi-Fi voice call quality; selecting a subset of the plurality of KPIs based on a correlation between each KPI and the voice call quality value; performing a plurality of discrete regression analyses based on the subsets of the plurality of KPIs and the voice call quality values to generate a plurality of regression results; determining an accuracy for each of the plurality of regression results; assigning weights to each of the plurality of regression results based on the determined accuracies; and combining the plurality of regression results using the assigned weights to generate a final combined estimated VoWiFi voice call quality algorithm that accurately predicts the voice call quality value based on values for the selected subset of the plurality of KPIs.

20 Claims, 8 Drawing Sheets

(51) Int. Cl.
 *H04M 7/00* (2006.01)
 *H04W 24/08* (2009.01)
 *H04W 84/12* (2009.01)

(52) U.S. Cl.
 CPC ...... *H04M 7/006* (2013.01); *H04M 2207/185* (2013.01); *H04W 24/08* (2013.01); *H04W 84/12* (2013.01)

METHODS AND SYSTEMS FOR EVALUATING VOICE OVER WI-FI (VOWIFI) CALL QUALITY

The present application is a continuation of U.S. patent application Ser. No. 15/199,265, filed Jun. 30, 2016, the entirety of which is hereby incorporated by reference herein.

BACKGROUND

One factor that customers take into account when selecting a wireless operator is the quality of wireless voice calls. To address call quality and to also offload voice traffic off of legacy third generation (3G) cellular networks, wireless carriers have introduced the capability of carrying voice traffic over high speed fourth generation (4G) networks, also referred to as voice over long term evolution (LTE) or VoLTE.

Unfortunately, in some circumstances, voice traffic over LTE (or other 4G networks) may suffer performance limitations in indoor environments, or environments that are located remotely from a suitable base station. To address these potential limitations, wireless service providers have developed the capability of leveraging existing local wireless networks, i.e., wi-fi networks, for voice traffic in instances in which the perceived quality of the wi-fi network is greater than the perceived quality of the LTE connection. However, determining which network to utilize in a given instance can be difficult to ascertain and should be based on accurate determinations or estimations of call quality.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Systems and methods are described herein for evaluating voice over wi-fi (VoWiFi) call quality in relation to conventionally or traditionally determined voice call quality measurements performed using a Perceptual Objective Listening Quality Assessment (POLQA) score.

According to some aspects of the subject technology, a computing device receives multiple training data points. Each data point in the multiple training data points includes a traditionally derived VoWiFi voice call quality value and values for at least a subset of a set of key performance indicators (KPIs) related to VoWiFi voice call quality. The VoWiFi voice call quality value may be a POLQA score or another measure of VoWiFi voice call quality. The multiple data points may include measured data points from a Long Term Evolution (LTE) cellular network or any other cellular network as well as data points relating to the wireless (e.g., Wi-Fi) network or networks to which a mobile device is connected, which may be referred to as radio frequency (RF) data points. The network indicator data may represent one or more values of one or more network performance attributes of the network(s) to which a mobile device is connected. The RF data may indicate an RF quality (e.g., one or more values of one or more RF quality factors) of the network(s) to which a mobile device is connected.

In some cases, the traditional or legacy voice call quality value (e.g., the POLQA score) may be calculated by comparing a local recording of a speaker speaking into a local microphone and a remote recording of the speaker speaking over a VoWiFi connection. The local microphone may be proximate (e.g., within 1 meter or within 5 meters) to a speaker, while the remote recording may be made using a VoWiFi phone call to a destination at which the speaker cannot be heard without the aid of telephone technology. The remote recording may be made, for example, 1 kilometer, 100 kilometers, or 1000 kilometers away from the speaker. The recordings may be played to various test subjects, and the test subject may provide an opinion score as to how "good" and "understandable" the remote recording is, relative to the local recording. For example, the test subject may be asked to rank the goodness or understandability of the remote speaker on a scale of 0 through 10, with 0 representing "I cannot understand the remote speaker at all," and 10 representing "I can understand the speaker as though he/she were standing right next to me." A Mean Opinion Score (MOS) of the opinion scores by the tests subjects may be calculated, for example, based on a mean of the 0 through 10 rankings described above.

Unfortunately, the above-described method of determining the voice quality value (e.g., the POLQA score) and other techniques that directly evaluate audio features are extremely cumbersome and costly to implement. For example, each evaluation requires professional hardware, such as high definition recorders, headphones, and playback devices, as well as significant human effort. Hence, direct evaluation of audio features is difficult to perform on a large-scale basis. Moreover, the direct evaluation of audio features does not analyze the root cause of poor voice quality and is thus unable to provide a mobile carrier with sufficient information gain (entropy) that allows the mobile carrier to optimize one or more aspects of the mobile network in order to remedy the poor voice quality.

To remedy these issues and as described herein, an approximation or estimation of the VoWiFi voice call quality score for VoWiFi calls may be determined by statistically, and autonomously, evaluating objective data relating to the calls. More specifically, the methods and systems described herein may facilitate voice quality assessment based on network indicator data and RF data measured by a network device, such as a mobile device or a combination of a mobile device and other network components, such as a base station, an access point, etc. By not basing the voice quality assessment on audio features (i.e., recorded audio clips), the methods and systems may minimize the hardware and human effort needed to determine voice call quality scores on a large-scale basis within a mobile network.

Moreover, the methods and systems provide a quantified causal relationship between voice quality and deviation in network conditions and may thereby allow a mobile carrier to more readily assess and remedy issues within the mobile network that have been demonstrably shown to result in poor voice quality. The voice quality model used in accordance with the methods and systems described herein may be calibrated to output voice call quality scores that are within a predetermined percentage of voice call quality scores generated by a POLQA system, such as that described above. Hence, the voice call quality scores generated by the methods and systems described herein may be comparable to those generated by POLQA, which is the recognized standard for quantified voice call quality scores.

In one embodiment, network indicator and/or RF features included in a set of training data training may be initially evaluated to ascertain particular key performance indicators (KPIs) and/or combinations of KPIs that are most highly correlated to the traditional voice call quality score. Using the identified KPIs as independent (predictor) variables and the traditional voice call quality score as the dependent (outcome) variables, a plurality of distinct regression analyses are performed. Each regression result may be weighted based on the relative accuracy of each regression analysis. The distinct regression results are then combined and re-weighted to generate a final VoWiFi voice call quality algorithm that most closely approximates or predicts the traditional voice call quality score for a given set of selected KPIs.

Once the VoWiFi voice call quality algorithm has been determined, the selected KPIs from testing data, such as live data, or data for which a traditional POLQA score has not been determined, may be evaluated based on the final VoWiFi voice call quality algorithm to generate an estimated or predicted voice call quality score.

Figure 1:
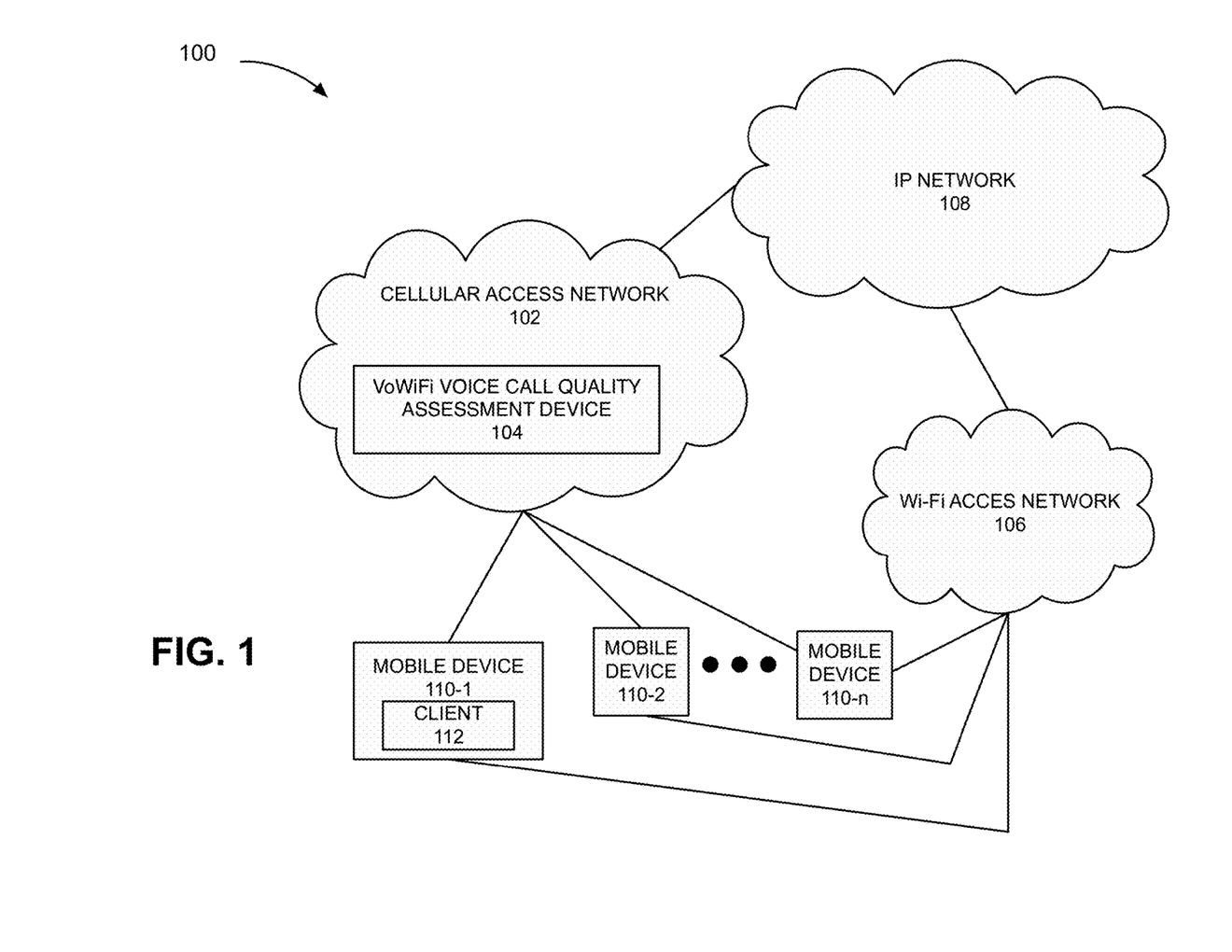
FIG. 1 is a diagram illustrating an exemplary environment for implementing the voice over Wi-Fi (VoWiFi) call quality assessment methodology described herein.

FIG. 1 is a diagram illustrating an exemplary environment 100 for implementing the VoWiFi call quality assessment methodology described herein. As shown, environment 100 includes, for example, a cellular access network 102 that includes a VoWiFi voice call quality assessment device 104, a Wi-Fi access network 106, an Internet Protocol (IP) network 108, and a plurality of mobile devices 110-1 to 110-n (individually referred to as mobile device 110, or collectively as mobile devices 110).

Environment 100 may be implemented to include wired, optical, and/or wireless connections among the devices and the networks illustrated, where appropriate. A connection may be direct or indirect and may involve one or more intermediary or additional devices not illustrated in FIG. 1.

Cellular access network 102 comprises components that facilitate Internet Protocol-based voice calls (e.g., non-circuit switched calls) between mobile devices 110. For example, cellular access network 102 may be a long term evolution (LTE) 4G wireless network and may include one or more devices that are physical and/or logical entities interconnected via standardized interfaces. Cellular access network 102 provides wireless packet-switched services and wireless IP connectivity to user devices (such as mobile devices 110) to provide, for example, data, voice, and/or multimedia services. Although not depicted in FIG. 1, it should be understood that cellular access network 102 includes various components associated with providing cellular voice and data services, such as a plurality of base station devices (e.g., evolved node B (eNodeB) devices), as well as an evolved packet core (ePC) that includes a mobility management entity, serving and packet data network gateway devices, a home subscriber server, etc.

VoWiFi voice call quality assessment device 104 may be implemented as a server or other computational device that receives data corresponding to a plurality of training VoWiFi calls. In some embodiments, VoWiFi voice call quality assessment device 104 may be integrated with the ePC of the cellular access network 102, while in other embodiments, VoWiFi voice call quality assessment device 104 may be located within IP network 108.

Consistent with embodiments described herein, the training data may include KPIs relating to network and radio frequency (RF) measurements, as well as traditionally ascertained voice call quality scores corresponding to each call.

As described in additional detail below, VoWiFi voice call quality assessment device 104 generates a voice quality model based on the received training data. The voice quality model may be optimized to generate scores that approximate the traditional voice call quality scores, but without the costs associated with such a traditional scoring mechanism. In one embodiment, a KPI selection methodology is utilized to identify the particular KPIs in the training data that most closely correlate to the traditional voice call quality score (either individually, or in combination with one or more other KPIs). Once the set of correlated KPIs has been determined, a plurality of discrete statistical analyses may be performed using data that corresponds to the set of correlated KPIs and the traditional voice call quality scores that correspond to those KPIs in attempt to model or predict voice call quality score for any given set of correlated KPIs.

As described in detail below, in some embodiments, the plurality of discrete statistical analyses include a number of different multiple regression calculations that each result in independent regression results based on the selected training data (e.g., the given sets of KPIs and their corresponding traditional voice call quality scores). Because each regression calculation may result in a more or less accurate approximation of the data, each result may be weighted based on their individual relative accuracies, often referred to as the $R^2$ value for the regression. Once each regression has been performed and weighted, the weighted regression results may be combined and an optimal weight for the set of regressions may be determined.

Once the optimal weight for the aggregate set of regressions is determined, an estimated voice call quality score may be confidently calculated for test or live data. The estimated voice call quality score may approximate the value of a traditional voice call quality score that corresponds to the data, without the necessity for acoustic model comparisons or human intervention.

Consistent with embodiments described herein, the individual and aggregated regression calculations may be periodically updated or refined based on additional data sets to reflect potential changes in network conditions that may cause a modification in the correlation of network conditions to a suitable voice call quality score.

Wi-Fi access network 106 comprises a wireless local area network (WLAN) that operates to provide wireless access to a data connection from an Internet service provider (ISP). Although not shown in FIG. 1, Wi-Fi access network 108 may include a home gateway, access point, or router device that supports the wireless connection to mobile devices 110, as well as corresponding ISP devices (e.g., optical or coaxial terminals, head end components, etc.) configured to provide Internet access to connected mobile devices 110.

IP network 108 may include one or multiple networks of one or multiple types. For example, IP network 108 may include the Internet, the World Wide Web, an IP Multimedia Subsystem (IMS) network, a cloud network, a wide area network (WAN), a metropolitan area network (MAN), a service provider network, a private IP network, some other type of backend network, and so forth. IP network 108 may include, for example, an IMS network, which may provide data and multimedia services to mobile devices 110.

Mobile device 110 includes a device that has computational and wireless communicative capabilities. Mobile device 110 may be implemented as a cellular telephone, such as a smart phone, or alternatively, may be implemented as a non-cellular device, such as a laptop or tablet computing device. Mobile device 110 may or may not be operated by a user. According to an exemplary embodiment, mobile device 110 includes a VoWiFi quality client tool 112 for providing a device interface to VoWiFi voice call quality assessment device 104.

Figure 2:
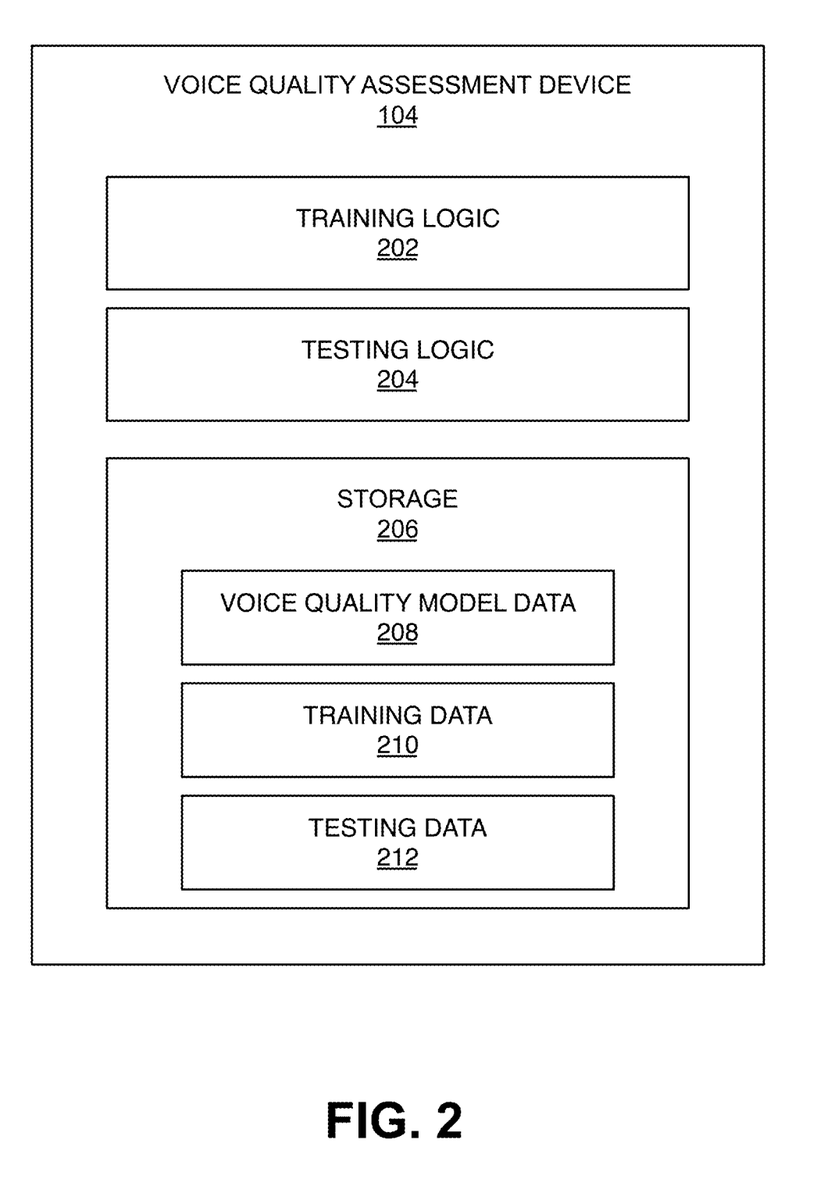
FIG. 2 is a block diagram of an exemplary embodiment of a VoWiFi voice call quality assessment device of FIG. 1.

FIG. 2 is a block diagram of an exemplary embodiment of VoWiFi voice call quality assessment device 104. As briefly described above, VoWiFi voice call quality assessment device 104 is configured to assess voice quality of mobile telephones operating on one or more wireless networks, such as an LTE or Wi-Fi network. As shown, VoWiFi voice call quality assessment device 104 may include, without limitation, training logic 202, testing logic 204, and storage 206 selectively and communicatively coupled to one another. Although components 202-206 are shown to be separate elements in FIG. 1, any of these components may be combined into fewer elements, such as into a single component, or divided into more components as may serve a particular implementation.

Additionally or alternatively, one or more of the components 202-206 may be omitted from VoWiFi voice call quality assessment device 104 and may be positioned external to or remote from VoWiFi voice call quality assessment device 104. For example, storage 206 may be located remotely relative to VoWiFi voice call quality assessment device 104 and may be communicatively coupled to VoWiFi voice call quality assessment device 104 via one or more network connections. Components 202-206 of VoWiFi voice call quality assessment device 104 may include or be otherwise implemented by one or more computing devices specifically configured to perform one or more of the operations described herein. In such implementations, VoWiFi voice call quality assessment device 104 may be referred to as a computing device-implemented system.

Storage 206 may store detection data generated and/or used by training logic 202 and/or testing logic 204. For example, storage 206 may comprise one or more database structures for storing voice quality model data 208 representative of a voice quality model built by training logic 202. Storage 206 may also store training data 210 used by training logic 202 to build the voice call quality model, and testing data 212 used by testing logic 204 to generate a voice call quality score for mobile devices 110. For example, as described above, training data 210 may include KPI data and traditional voice call quality values (e.g., POLQA scores) for a plurality of sample or training calls and testing data 212 may include KPI data for calls for which a predicted or estimated voice call quality score is to be determined. Storage 206 may store additional or alternative data as may serve a particular implementation. Data stored by storage 206 may be accessed by system 100 from any suitable source, including a source internal or external to VoWiFi voice call quality assessment device 104.

Training logic 202 may build the voice quality assessment model (also referred to as the voice quality assessment algorithm) that may be subsequently used to generate voice call quality scores that quantify a quality of voice communications for mobile devices at various locations within a cellular or wi-fi network. In particular, as briefly described above, training logic 202 may facilitate selection of most highly correlated KPIs and may perform a number of different multiple regression analyses and weight determinations to accurately model a voice call quality score outcome based on a given set of predictor KPIs.

Testing logic 204 may use the voice quality assessment model built by training logic 202 to derive a voice call quality score for a mobile device 110 coupled to cellular access network 104 and Wi-Fi access network 106. To this end, testing logic 204 may receive, from a mobile device 110 operating on cellular access network 104 and Wi-Fi access network 106, a test record that includes network indicator data and RF data both measured by the mobile device 110 while the mobile device 110 is at a location within the cellular and Wi-Fi networks 104/106. Testing logic 204 may then utilize the voice call quality model generated by training logic 202 to accurately predict a voice call quality score associated with the received call KPI data. In some embodiments, the predicted voice call quality score may be used by mobile devices 110 to determine when to handoff calls from cellular access network 104 to Wi-Fi access network 106 or vice-versa.

Figure 3:
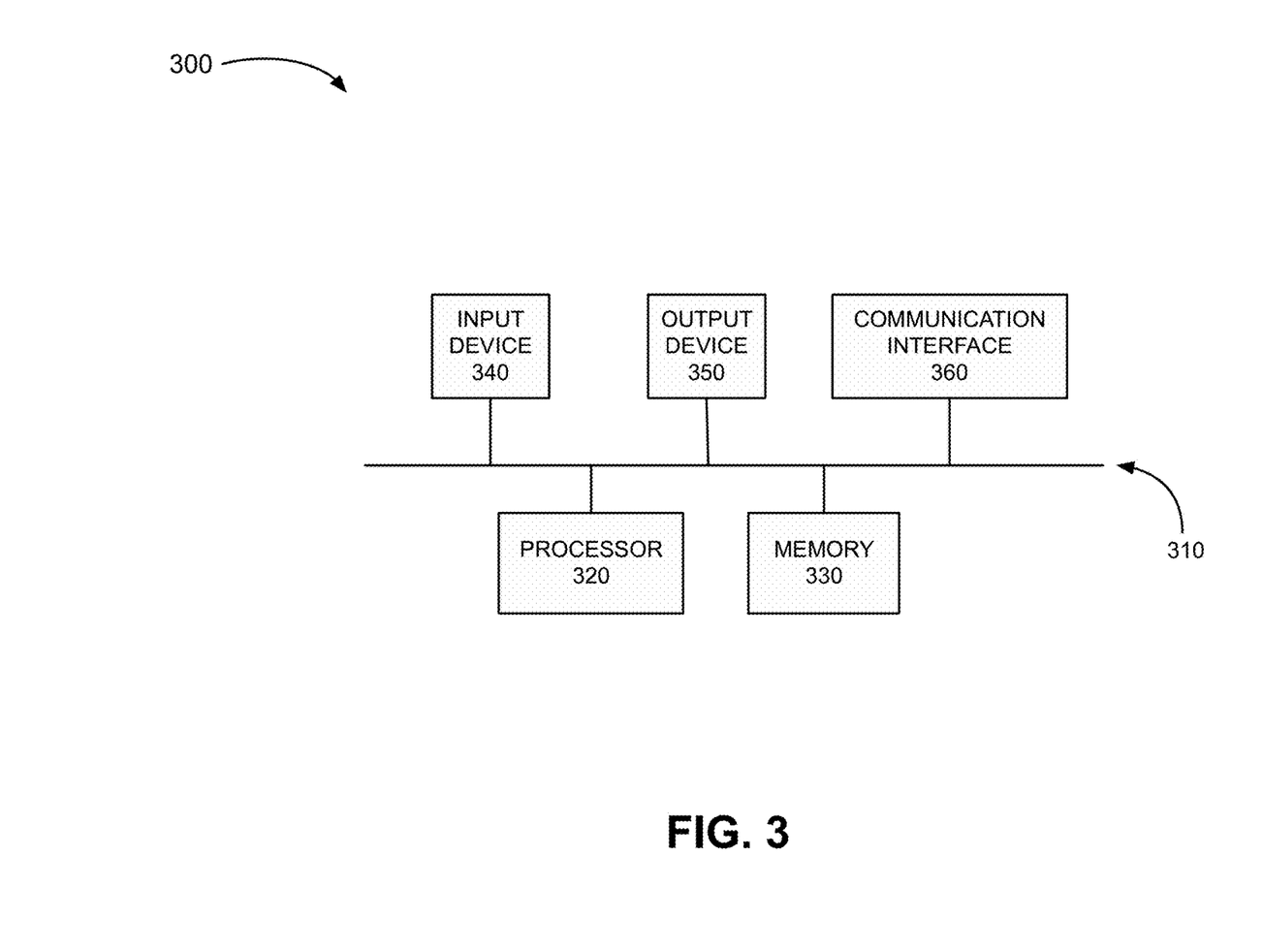
FIG. 3 is a diagram illustrating exemplary components of a device that may correspond to one or more of the devices illustrated herein.

FIG. 3 is a diagram illustrating exemplary components of a device 300. Device 300 may correspond, for example, to a component mobile device 110, VoWiFi voice call quality assessment device 104, mobile devices, or a component within cellular access network or Wi-Fi access network. Alternatively or additionally, such devices may include one or more devices 300 and/or one or more components of device 300.

Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
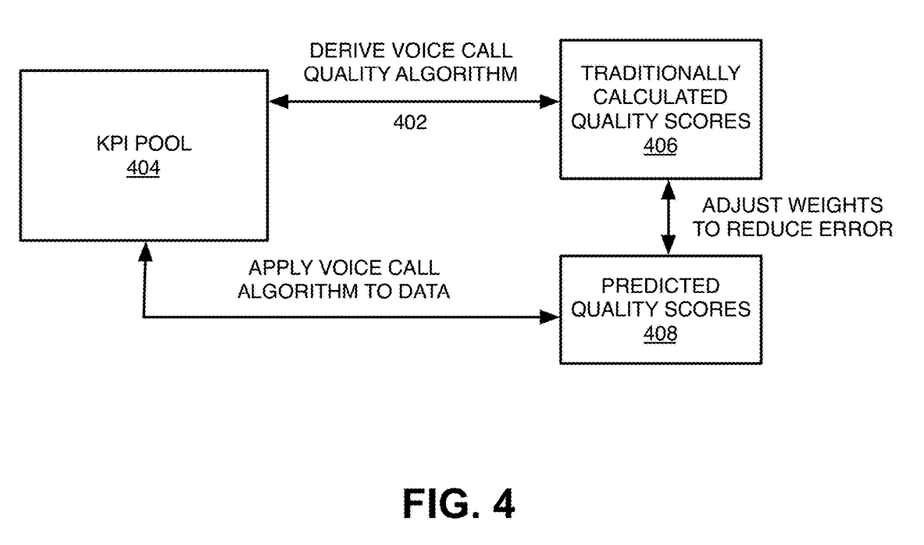
FIG. 4 is a process flow diagram that conceptually illustrates an exemplary operation of training logic and testing logic of FIG. 2 in terms of the data stored in the storage of FIG. 2.

FIG. 4 is a process flow diagram that conceptually illustrates an exemplary operation of training logic 202 and testing logic 204 in terms of the data stored in storage 206. As shown, the VoWiFi voice call quality algorithm generated by training logic 202 is derived (402) based on a pool of available KPI values 404 and a set of traditionally calculated call quality scores 406 retrieved from training data 210.

To derive the VoWiFi voice call quality algorithm, training logic 204 may initially perform feature selection on the pool of KPI values 404 to determine the most correlative KPI values to the traditionally calculated call quality scores 406. In one implementation, the correlation of each possible KPI (e.g., each KPI included in the KPI pool 404) to the corresponding training data voice call quality score (e.g., the POLQA score) may be determined using a linear correlation technique, such as a Pearson correlation or a ranked Pearson correlation, which is known as a Spearman correlation. The correlation analysis ascertains the extent to which a modification of one variable affects another, with a perfect positive correlation (e.g., an increase in variable A directly correlates to an increase in variable B) being indicated by a value of 1, a perfect negative correlation (e.g., an increase in variable A directly correlates to a decrease in variable B) being indicated by a value of −1 and a lack of correlation being indicated by a value of 0. A Spearman correlation is sometimes advantageous relative to a general Pearson correlation in that it is less sensitive to statistical outliers by virtue of the rankings of the data being used to perform the correlation analysis.

In other embodiments, a decision tree learning methodology is used to determine the most correlative KPIs by leveraging gini impurity or information gain to determine the most significant KPIs.

In an exemplary embodiment, such a KPI selection process may determine that the most correlative KPIs for evaluating VoWiFi call quality include real time protocol (RTP) packet loss percentage, RTP jitter, RTP latency, RTP gap ratio, RTP session duration, packet data convergence protocol (PDCP) throughput, radio link control (RLC) throughput, the number of physical downlink shared channel physical resource blocks (PDSCH.PRB), a PDSCH block error rate (BER), and a handover happening indicator value.

Once the most correlative KPIs have been determined, the discrete multiple regression analyses are performed using some or all of the set of selected KPIs to derive the VoWiFi voice call quality algorithm. As briefly described above, the components of the VoWiFi voice call quality algorithm are tuned or weighted so as to bring the mean error rate of any calculated or predicted call quality score 408 to within about 0-10% of the traditional call quality score and preferable within about 5%. As depicted in FIG. 4, the derivation and tuning of the VoWiFi voice call quality algorithm are fundamentally recursive in that the generated algorithm may be continually or periodically adjusted to reflect either additional data, or to reflect changes in the permissible mean error rate.

Figure 5:
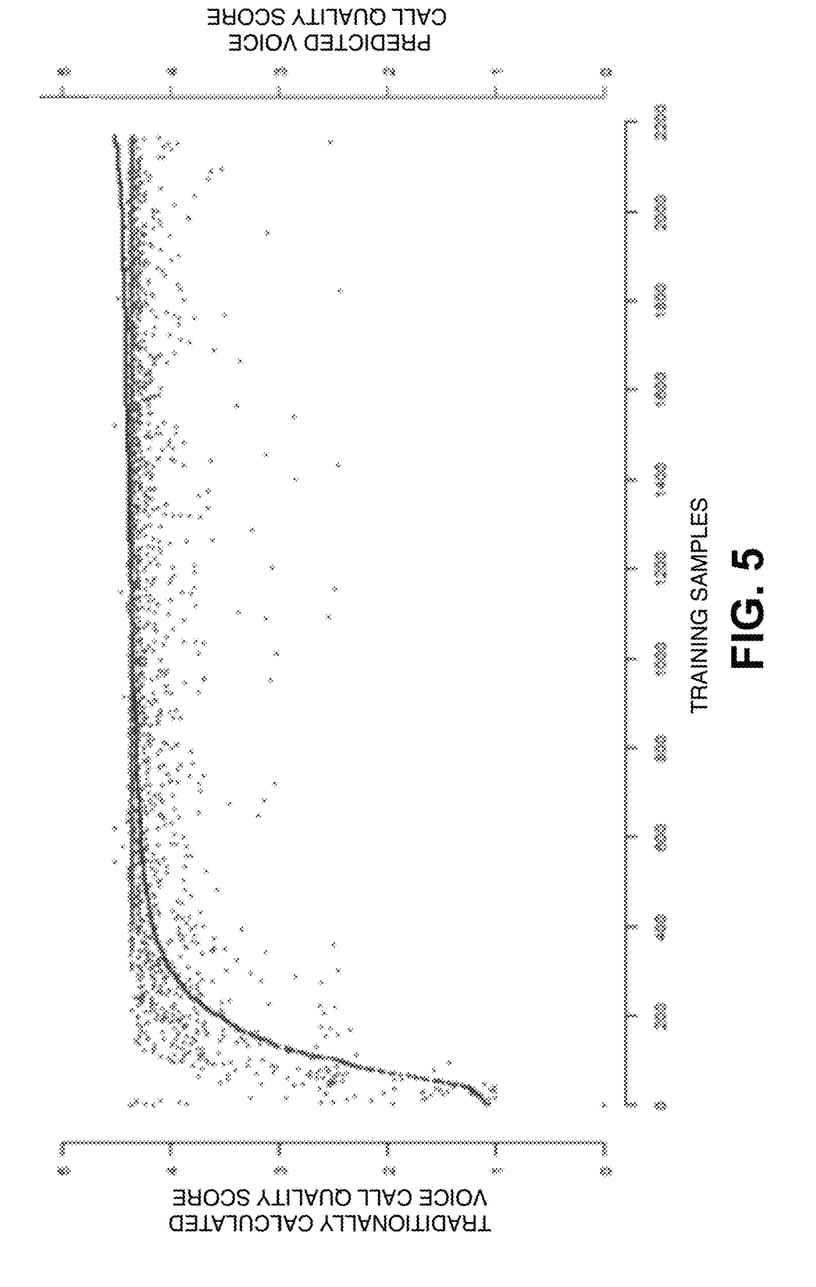
FIG. 5 is a graph depicting exemplary predicted VoWiFi scores relative to the traditional call quality scores when a VoWiFi voice call quality algorithm has been properly tuned.

FIG. 5 is a graph depicting an exemplary predicted VoWiFi scores relative to the traditional call quality scores when the VoWiFi voice call quality algorithm has been properly tuned. In this example, the mean error rate of the predicted VoWiFi scores is approximately 5%, with a corresponding mean accuracy rate of approximately 95%.

Figure 6:
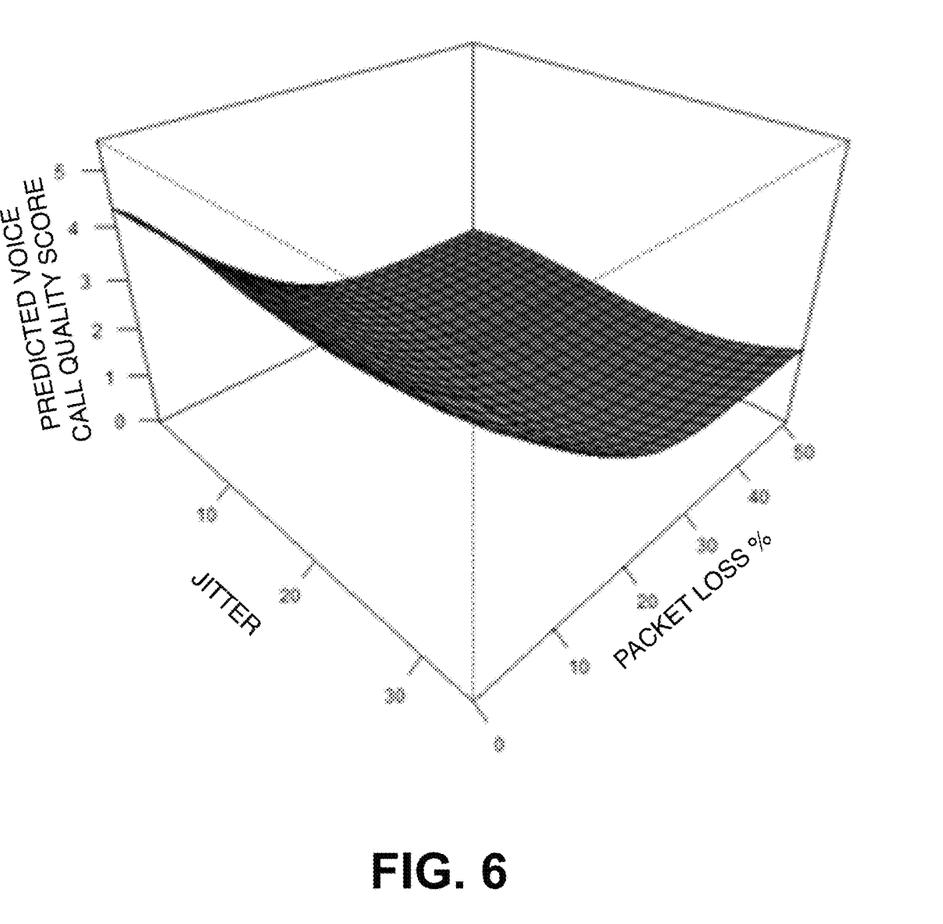
FIG. 6 is a three dimensional graph illustrating predicted VoWiFi scores relative to two selected key performance indicators (KPIs)

FIG. 6 is a three dimensional graph illustrating predicted VoWiFi scores relative to two of the selected KPIs. In this example, the two selected KPIs include packet loss percentage and jitter, both of which are highly correlative to predicted VoWiFi voice call quality score.

Figure 7:
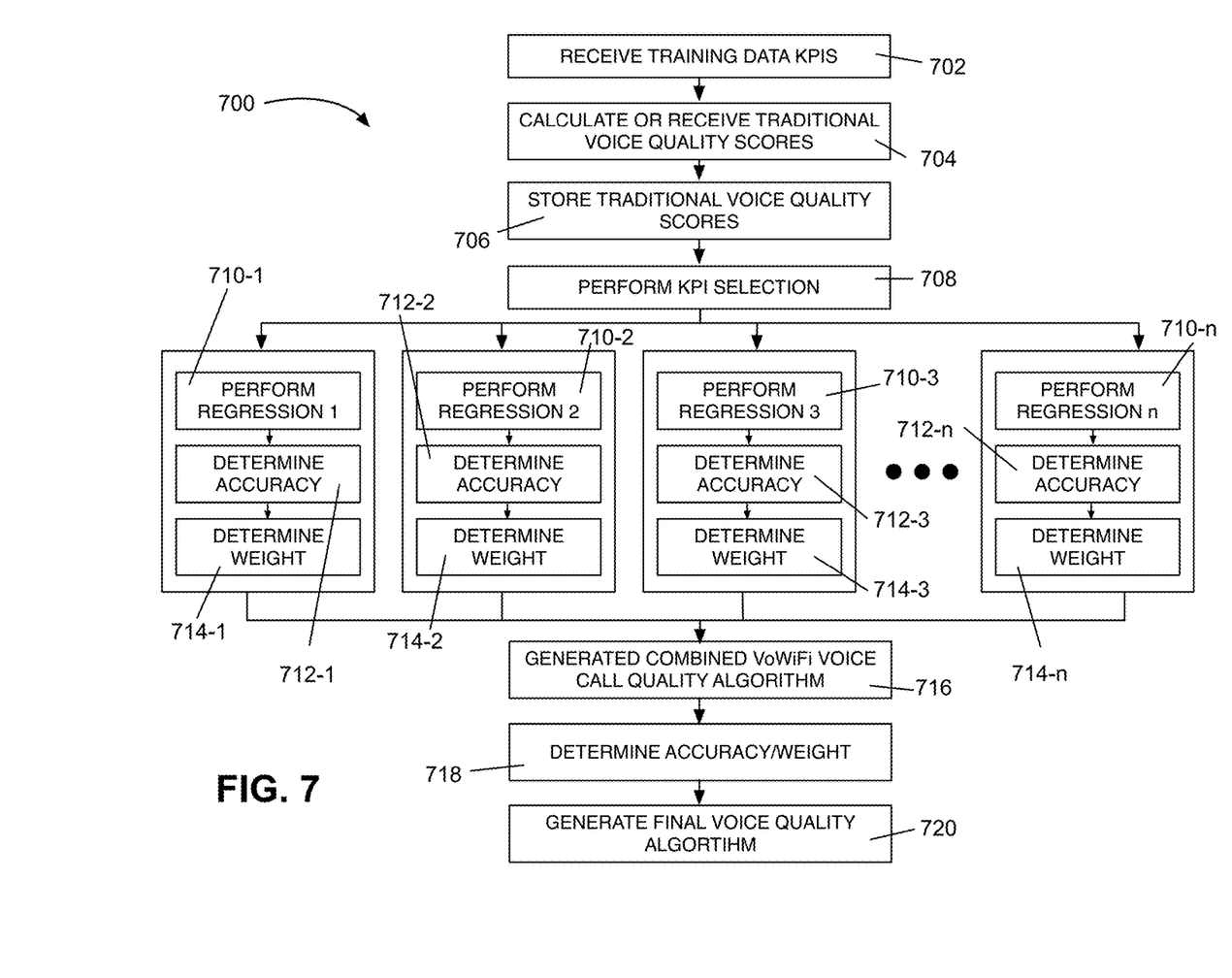
FIG. 7 is a flow diagram illustrating an exemplary process for determining VoWiFi call quality consistent with embodiments described herein.

FIG. 7 is a flow diagram illustrating an exemplary process 700 for determining VoWiFi call quality consistent with embodiments described herein. In one implementation, process 700 may be implemented by a dedicated VoWiFi voice call quality assessment device 104. In another implementation, process 700 may be implemented by a component of cellular access network 102 that incorporates the features of VoWiFi voice call quality assessment device 104 or in conjunction with one or more other devices in network environment 100.

Referring to FIG. 7, process 700 may include receiving and storing training data, such as network and RF KPI data, for a plurality of sample VoWiFi calls (block 702). For example, training logic 202 may receive VoWiFi call data, e.g., from a client application executing on mobile devices 110. At block 704, traditional or conventional voice call quality scores may be determined based on the call data. For example, as described above, the traditional voice call quality scores (e.g., the POLQA scores) may be determined by comparing a local recording of a speaker speaking into a local microphone and a remote recording of the speaker speaking over the VoWiFi connection. The recordings may be played to various test subjects, and results in a Mean Opinion Score (MOS) representative of the call quality.

In some embodiments, the traditional voice call quality scores may be determined outside of the VoWiFi voice call quality assessment device 104, with VoWiFi voice call quality assessment device 104 merely receiving the resultant scores that correspond to the received KPI data. In other embodiments, VoWiFi voice call quality assessment device 104 may act as a repository for receiving the call data and recordings for review by the test subjects. In any event, at block 706, the traditional voice call quality score is stored for subsequent use by VoWiFi voice call quality assessment device 104.

Next, using the stored KPI data and the corresponding traditional voice call quality scores, KPI selection is performed (block 708). For example, as briefly described above, training logic 202 may calculate correlation indices (e.g., correlation coefficients) for each KPI in relation to the traditional voice call quality scores. For example, a Spearman correlation may be performed to identify the most correlative KPIs. More specifically, a pair-wise relationship of voice call quality scores and KPIs may be visualized. The KPIs showing high impact on the voice call quality score may be selected as independent variable candidates.

In an exemplary embodiment, the most correlative KPIs may be selected for inclusion into the predicted voice call quality score algorithm generation process. In particular, a number of KPIs ranging from 3 to 12 may be included with varying levels of resulting complexity. As set forth above, exemplary KPIs selected for inclusion may include RTP Packet loss percentage, RTP Jitter, RTP Latency, RTP Gap Ratio, RTP Session Duration, PDCP Throughput, RLC Throughput, PDSCH.PRB, PDSCH BER, and the handover happening indicator value.

At blocks 710-1 to 710-n, the selected KPIs and the traditional voice call quality scores are subjected to a plurality, n, of different regression analyses, where n could range from 3 to 8. For example, training logic 202 may perform a linear regression (710-1), a second order polynomial regression (710-2), a third order polynomial regression (710-3), a lasso regression (710-4), a ridge regression (710-5), an elastic regression (710-6), and a generalized additive model regression (710-7).

Furthermore, in some embodiments, at block 710-n, in addition to the calculation of these seven known statistical regression models, an Adaptive Local Weight Scatterplot Smoothing (A-LOESS) regression may also be performed. It is to be understood that additional, fewer or different regressions can be used. A-LOESS improves traditional LOESS by adaptively computing a proper or optimized window size during the regression, instead of the fixed window size in traditional LOESS. More specifically, the voice call quality scores are placed into different bins, and the window sizes for each local set are dynamically adjusted based on the the distribution density of each bin. For example, in one implementation, 9 bins may be established according to the scale of the traditional voice call quality score, from bin0 that includes scores from 0 to 0.5 to bin8 that includes scores from 4.5 to 5, etc.

An initial window width may be set to l=100 of range of sample points, and a scatterplot of all measured voice call quality scores may be plotted in an ascending order. Let f(x) denote the scatterplot function, where x is from 1 to the number of sample points. First, for each bin a (e.g., bin0 to bin8) we compute its distribution density by integrating the value of the scatterplot function in its range as follows:

$$y_\alpha = \int_{f^{-1}(0.5a)}^{f^{-1}(0.5a+0.5)} f(x)dx, (i=0,\ldots,8)$$

Subsequently, the value of $y_a$ is sorted in ascending order. Let $S(y_a)$min represent the bin with minimum $y_a$, $S(y_a)$med represent the bin that has the median value of $y_a$, and $S(y_a)$max represent the bin with maximum $y_a$. Next, the window sizes are dynamically calculated by sorting the results, as follows:

$$\text{win\_size} = \begin{cases} \frac{0.5 + 0.125 \cdot S}{100} \cdot N, & \text{if } S = 0, \ldots, 4 \\ \frac{1 + 0.25 \cdot (S-4)}{100} \cdot N, & \text{if } S = 5, \ldots, 8, \end{cases}$$

Finally, the adaptive window size may be calculated to perform LOESS regression to the voice call quality score based on the selected KPIs.

Still referring to FIG. 7, once each individual regression has been performed, the accuracy of each regression is determined (blocks 712-1 to 712-n). For example, training logic 202 may calculate a mean error rate for each regression to determine the variance of the predicted voice call quality scores relative to the actual voice call quality score determined by the conventional means. In an alternative implementation, the accuracy of each regression may be determined using a least squares fit analysis. Using the accuracy determinations for each regression, weights are applied to each regression result, with the aggregate weights totaling to 1, such that combination of all of the resulting scores when their respective weights are applied will approximate the voice call quality score block 714-1 to 714-n).

Once individual weights have been determined for each regression result, the results are combined to generate a combined estimated VoWiFi voice call quality algorithm (block 716). Next, an accuracy calculation is performed on the combined estimated VoWiFi voice call quality algorithm to calculate a weight (block 718) for applying to the combined score to allow it to best approximate the traditionally ascertained voice call quality score. For example, the weight may be selected to result in estimated VoWiFi voice call quality scores having a mean error rate that is within approximately 0-10% of the traditionally generated voice call quality scores (e.g., the POLQA scores). Using the determined weight, a final combined estimated VoWiFi voice call quality algorithm may be generated (block 720).

In one embodiment, Quadratic Programming is used to determine the optimum weight. For example, assume that for a given voice call quality assessment we have 7 regression fitted series: Y1, Y2, . . . Y7, and assume that Y is the traditionally measured voice call quality score. Quadratic Programming may be performed to solve for the weight that minimize the square sum of the errors.

Figure 8:
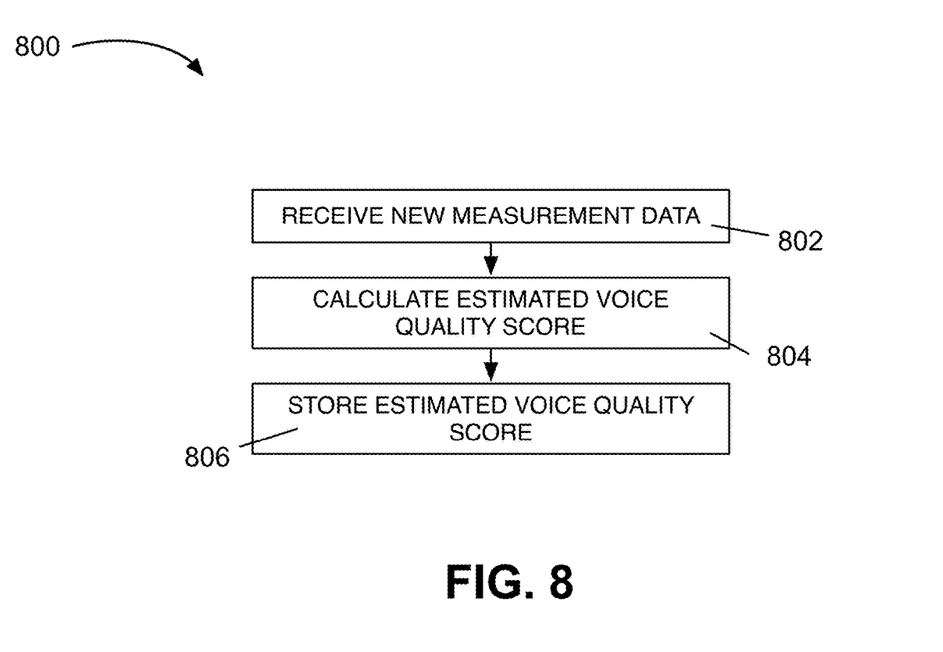
FIG. 8 is a flow diagram illustrating an exemplary process for determining an estimated VoWiFi voice call quality score.

FIG. 8 is a flow diagram illustrating an exemplary process 800 for determining an estimated VoWiFi voice call quality score using the combined estimated VoWiFi voice call quality algorithm derived in the manner described in relation to FIG. 7. In one implementation, process 800 may be implemented by voice call quality assessment device 104, such as testing logic 204. In another implementation, process 800 may be implemented by a component of cellular access network 102 or, alternatively, a component or application executing on mobile device 110.

As shown in FIG. 8, process 800 begins when a new measurement is received (block 802). For example, testing logic 204 may receive a set of KPIs relating to a VoWiFi call from mobile device 110. In block 804, selected ones in the received set of KPIs are inserted into the combined estimated VoWiFi voice call quality algorithm to generate an estimated VoWiFi voice call quality score. The estimated VoWiFi voice call quality score may be stored (block 806). For example, testing logic 204 may store the estimated VoWiFi voice call quality score in storage 206 for diagnostic or evaluative purposes. In some embodiments, an indication of the estimated VoWiFi voice call quality score is output to, for example, the mobile device 110 from which the set of KPIs on which the score is based is received. In other embodiments, an indication of the estimated VoWiFi voice call quality score may be used as a basis for determining whether to handoff a voice call to carrier access network 102, e.g., as a voice over LTE (VoLTE) call.

In some embodiments, testing logic 204 may provide, using output component 350 of testing logic 204 or another output device, such as mobile device 110, an indication of one or more of the input KPIs that most impacted the estimated VoWiFi voice call quality score. In this manner, VoWiFi voice call quality assessment device 104 may inform users regarding what KPI(s) to change or address to improve the predicted VoWiFi voice call quality score in a case where the predicted VoWiFi voice call quality score is insufficient. VoWiFi voice call quality assessment device 104 may be provided with price(s) for changing the KPI(s), and may indicate, based on the price(s), which KPI(s) should be changed to cause a greatest increase in VoWiFi voice call quality per unit of currency (e.g., dollar) spent.

The foregoing description of embodiments provides illustration but is not intended to be exhaustive or to limit the embodiments to the precise form disclosed. Accordingly, modifications to the embodiments described herein may be possible.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," and "the" does not, without further constraints, preclude the existence of additional identical elements in the process, method, article, or apparatus that comprises the element and are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks or process steps have been described with regard to the processes illustrated in FIGS. 4, 7, and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 320, etc.), or a combination of hardware and software. The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 320) of a computational device. A non-transitory storage medium includes one or more of the storage mediums described in relation to memory/storage 330.

No element, act, or instruction described in the present application should be construed as critical or essential to the embodiments described herein unless explicitly described as such.

What is claimed is:

1. A method implemented on a computing device comprising:
receiving a plurality of training data points, wherein each data point in the plurality of training data points includes a voice call quality value and values for a plurality of key performance indicators (KPIs) related to voice over wi-fi voice call quality;
selecting a subset of the plurality of KPIs;
performing a plurality of discrete regression analyses based on the subsets of the plurality of KPIs and the voice call quality values to generate a plurality of regression results;
determining an accuracy for each of the plurality of regression results;
assigning weights to each of the plurality of regression results based on the determined accuracies; and
combining the plurality of regression results using the assigned weights to generate a final combined estimated voice over Wi-Fi (VoWiFi) voice call quality algorithm that accurately predicts the voice call quality value based on values for the selected subset of the plurality of KPIs.

2. The method of claim 1, wherein the voice call quality value comprises a traditionally determined Perceptual Objective Listening Quality Assessment (POLQA) score.

3. The method of claim 1, wherein the selected subset of the plurality of KPIs comprises at least two KPIs correlated to the voice call quality value.

4. The method of claim 3, wherein the selected subset of the plurality of KPIs are selected from real time protocol (RTP) Packet loss percentage, RTP Jitter, RTP Latency, RTP Gap Ratio, RTP Session Duration, packet data convergence protocol (PDCP) throughput, radio link control (RLC) Throughput, the number of physical downlink shared channel physical resource blocks (PDSCH.PRB), a PDSCH block error rate (BER), and a handover happening indicator value based on the correlation of each KPI to the voice call quality value.

5. The method of claim 1, further comprising:
receiving a new subset of the plurality of KPIs from a mobile device;
determining the estimated VoWiFi voice call quality value based on the combined estimated VoWiFi voice call quality algorithm and the new subset of the plurality of KPIs; and
outputting an indication of the estimated VoWiFi voice call quality value.

6. The method of claim 1, further comprising:
determining the correlation using a Spearman correlation technique.

7. The method of claim 1, wherein performing the plurality of discrete regression analyses comprises performing a number of discrete regression analyses, wherein the number ranges from 3 to 8.

8. The method of claim 7, wherein the number of discrete regression analyses comprise a linear regression, a second order polynomial regression, a third order polynomial regression, a lasso regression, a ridge regression, an elastic regression, a generalized additive model regression, and an adaptive local weight scatterplot smoothing (A-LOESS) regression.

9. The method of claim 7, further comprising:
assigning different weights to the plurality of regression results based on the determined accuracy,
wherein the total of all weights combines to a value of one.

10. The method of claim 9, further comprising:
assigning an updated weight to the combined estimated VoWiFi voice call quality algorithm to generate the final estimated VoWiFi voice call quality algorithm.

11. The method of claim 10, wherein the updated weight is calculated using a quadratic programming technique based on the different weights assigned to plurality of regression results.

12. A device comprising:
a communication interface;
a memory, wherein the memory stores instructions; and
a processor, wherein the processor executes the instructions to:
receive a plurality of training data points, wherein each data point in the plurality of training data points includes a voice call quality value and values for a plurality key performance indicators (KPIs) related to voice over wi-fi voice call quality;
select a subset of the plurality of KPIs;
perform a plurality of discrete regression analyses based on the subsets of the plurality of KPIs and the voice call quality values to generate a plurality of regression results;
determine an accuracy for each of the plurality of regression results;
assign weights to each of the plurality of regression results based on the determined accuracies; and
combine the plurality of regression results using the assigned weights to generate a final combined estimated VoWiFi voice call quality algorithm that accurately predicts the voice call quality value based on values for the selected subset of the plurality of KPIs.

13. The device of claim 12, wherein the voice call quality value comprises a traditionally determined Perceptual Objective Listening Quality Assessment (POLQA) score.

14. The device of claim 12, wherein the selected subset of the plurality of KPIs comprises at least two KPIs correlated to the voice call quality value and selected from real time protocol (RTP) Packet loss percentage, RTP Jitter, RTP Latency, RTP Gap Ratio, RTP Session Duration, packet data convergence protocol (PDCP) throughput, radio link control (RLC) Throughput, the number of physical downlink shared channel physical resource blocks (PDSCH.PRB), a PDSCH block error rate (BER), and a handover happening indicator value based on the correlation of each KPI to the voice call quality value.

15. The device of claim 12, wherein the processor to perform the plurality of discrete regression analyses further executes the instructions to perform a number of discrete regression analyses, wherein the number ranges from 3 to 8.

16. The device of claim 15, wherein the number of discrete regression analyses comprise a linear regression, a second order polynomial regression, a third order polynomial regression, a lasso regression, a ridge regression, an elastic regression, a generalized additive model regression, and an adaptive local weight scatterplot smoothing (A-LOESS) regression.

17. The device of claim 15, wherein the processor further executes the instructions to:
assign different weights to the plurality of regression results based on the determined accuracy,
wherein the total of all weights combines to a value of one.

18. The device of claim 17, wherein the processor further executes the instructions to:
assign an updated weight to the combined estimated VoWiFi voice call quality algorithm to generate the final estimated VoWiFi voice call quality algorithm.

19. A non-transitory, computer-readable storage medium storing instructions executable by a processor of a computational device, which when executed cause the computational device to:
receive a plurality of training data points, wherein each data point in the plurality of training data points includes a voice call quality value and values for a plurality key performance indicators (KPIs) related to voice over wi-fi voice call quality;
select a subset of the plurality of KPIs based on the correlation;
perform a plurality of discrete regression analyses based on the subsets of the plurality of KPIs and the voice call quality values to generate a plurality of regression results;
determine an accuracy for each of the plurality of regression results;
assign weights to each of the plurality of regression results based on the determined accuracies; and
combine the plurality of discrete regression results using the assigned weights to generate a final combined estimated voice over Wi-Fi (VoWiFi) voice call quality algorithm that accurately predicts the voice call quality value based on values for the selected subset of the plurality of KPIs.

20. The non-transitory, computer-readable storage medium of claim 19, further storing instructions executable by the processor of the computational device, which when executed cause the computational device to:
perform a range of three to eight distinct regression analyses selected from a linear regression, a second order polynomial regression, a third order polynomial regression, a lasso regression, a ridge regression, an elastic regression, and a generalized additive model regression, and an adaptive local weight scatterplot smoothing (A-LOESS) regression;
assign different weights to results of the range of three to eight regression analyses based on the determined accuracy,
wherein the total of all weights combines to a value of one; and
assign an updated weight to the combined estimated VoWiFi voice call quality algorithm to generate the final estimated VoWiFi voice call quality algorithm.

* * * * *